Nov. 19, 1946.  L. H. ZEUN  2,411,179
DESICCATING APPARATUS
Filed April 7, 1944  3 Sheets-Sheet 2
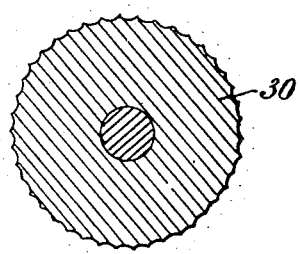
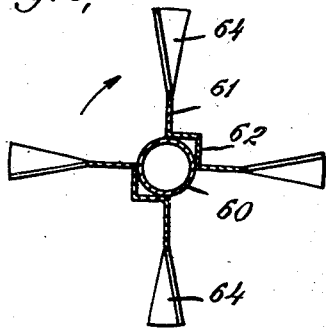
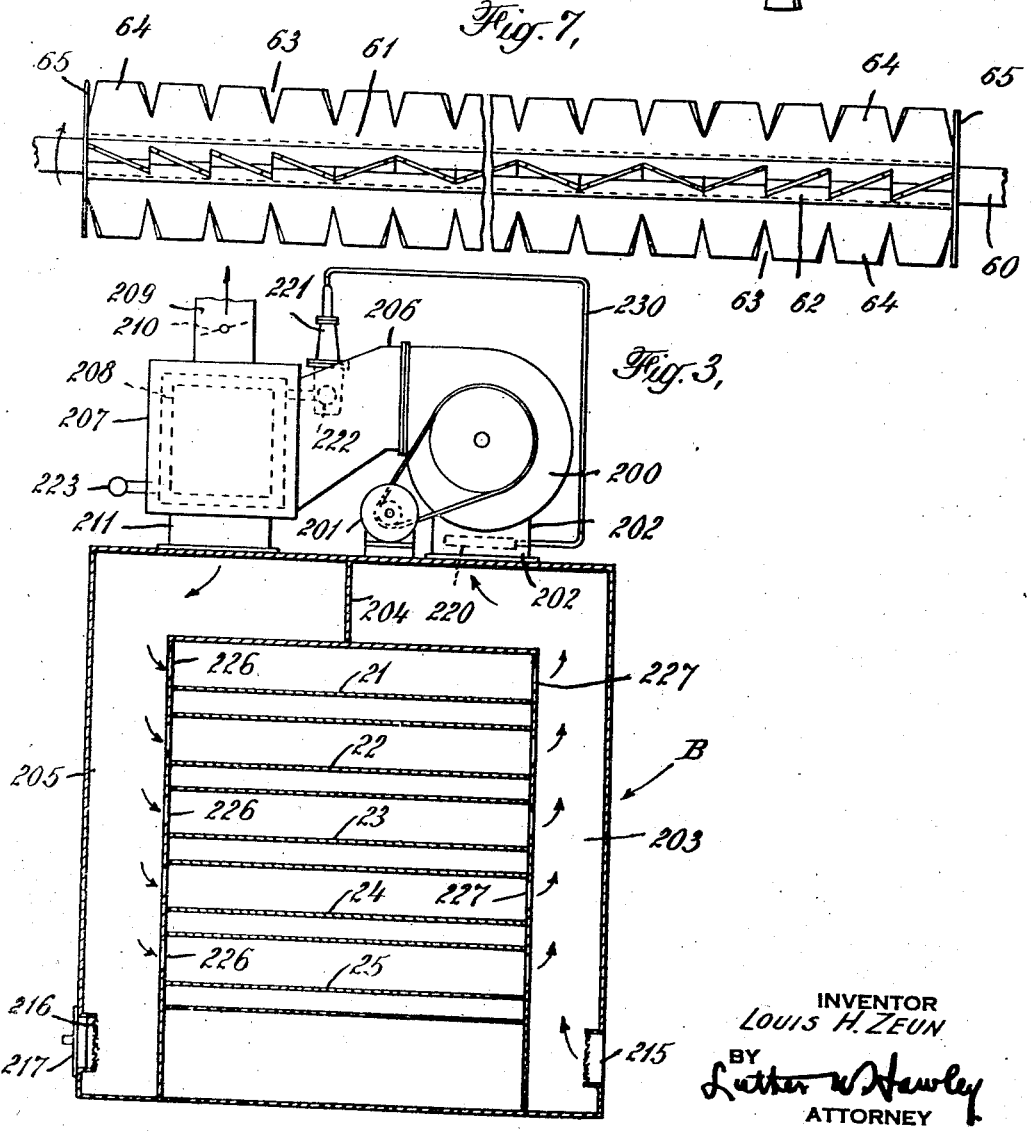
INVENTOR
LOUIS H. ZEUN
BY
Luther W. Hawley
ATTORNEY Nov. 19, 1946.    L. H. ZEUN    2,411,179
DESICCATING APPARATUS
Filed April 7, 1944    3 Sheets-Sheet 3
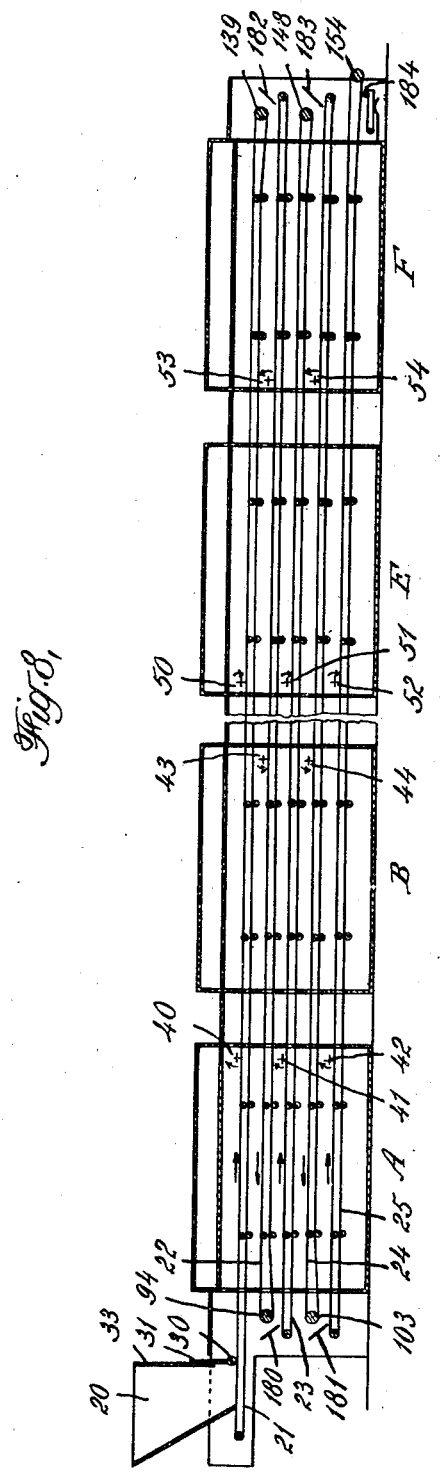
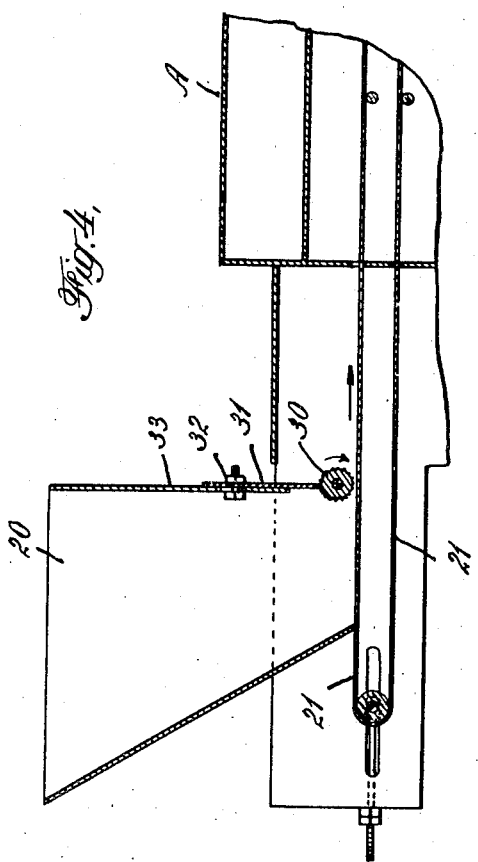
INVENTOR
LOUIS H. ZEUN
BY
ATTORNEY Patented Nov. 19, 1946

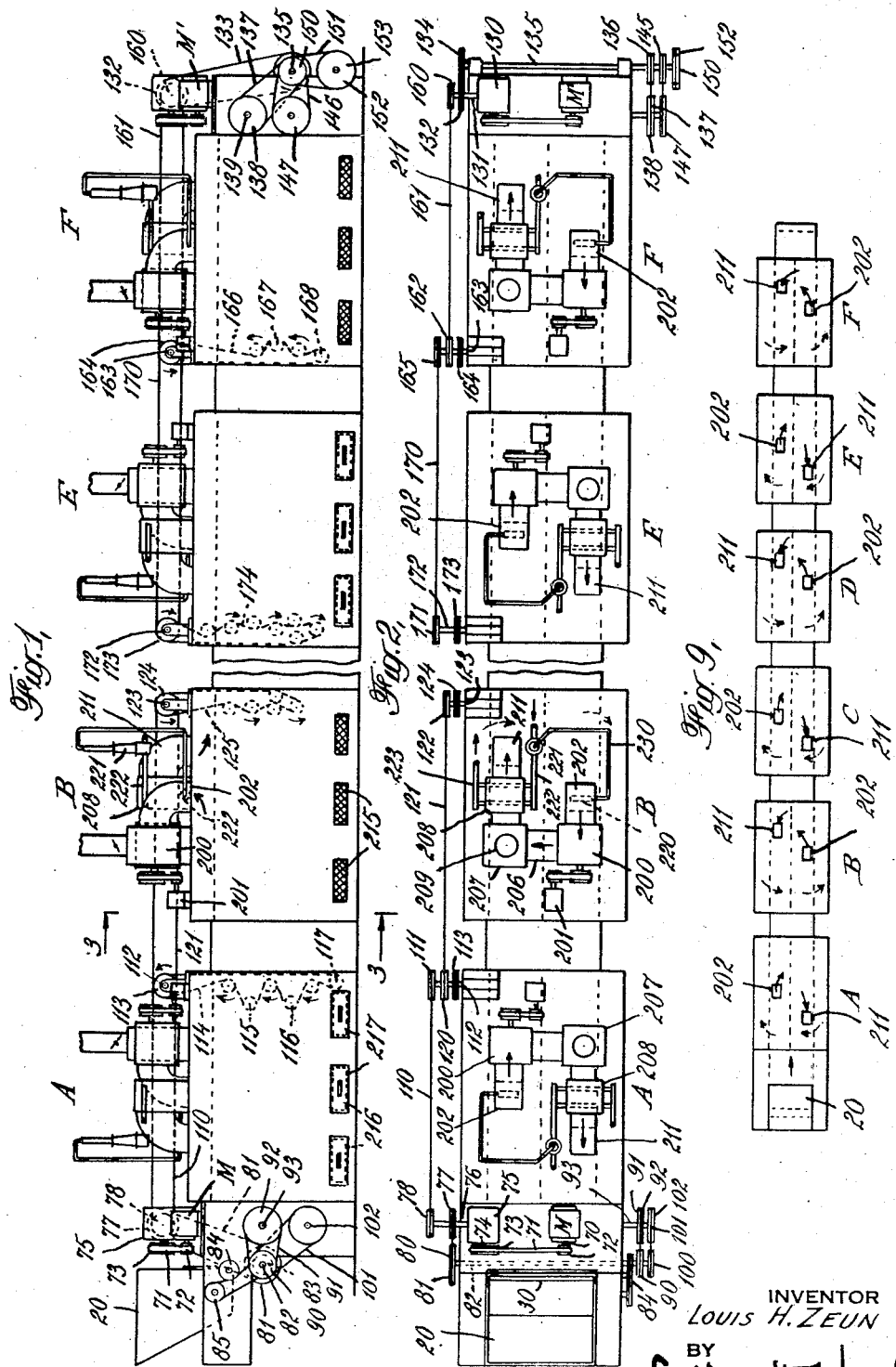

2,411,179

UNITED STATES PATENT OFFICE 2,411,179

DESICCATING APPARATUS

Louis H. Zeun, Naugatuck, Conn., assignor to Peter Paul, Inc., Naugatuck, Conn., a corporation of Delaware Application April 7, 1944, Serial No. 529,961

5 Claims. (Cl. 34—203)

This invention relates to desiccating apparatus. More particularly stated, the invention relates to a machine for desiccating or drying coconut meat. This meat in its natural state or as taken from the shell is very moist or wet. In this state it is not suitable for commercial use and most of the water or moisture must be abstracted therefrom.

This invention has for its salient object to provide practical and efficient apparatus for removing the water or moisture from coconut fiber or meat.

Another object of the invention is to provide a machine particularly adapted to desiccate shredded coconut meat and so constructed and designed as to insure a uniform product.

Another object of the invention is to provide apparatus of the character described so constructed and arranged as to insure the passage therethrough of a uniform layer of material or a layer of uniform thickness and, furthermore, having means for effectively agitating or turning over the material during its passage through the driers in order to effect a maximum contact of the drying air with the material.

Further details of the invention will appear from the following specification taken in connection with the drawings which form a part of this application, and in which Fig. 1 is an elevational view of desiccating apparatus constructed in accordance with the invention;

Fig. 2 is a top plan view of the construction shown in Fig. 1;

Fig. 3 is an enlarged sectional elevation taken substantially on line 3—3 of Fig. 1, looking in the direction of the arrows;

Fig. 4 is an enlarged sectional elevation illustrating the hopper, the receiving conveyor beneath the hopper, and the means for insuring a uniform layer of material on the conveyor;

Fig. 5 is an enlarged end elevation of the corrugated roller which regulates the thickness of the layer on the receiving conveyor;

Fig. 6 is an end elevation of one of the agitators;

Fig. 7 is a plan view of the agitator;

Fig. 8 is a sectional elevation illustrating the arrangement of the conveyor belts and agitators; and Fig. 9 is a diagrammatic plan view of the apparatus illustrating particularly the drying air circulation.

The invention briefly described consists of apparatus comprising a plurality of units through which superposed conveyors carry the material to be desiccated or dried. The material is fed to the top conveyor by gravity from a hopper and means is provided at the bottom of the hopper for insuring a layer of material of uniform thickness on the conveyor.

In each unit of the apparatus agitating means are provided for engaging the layers of material passing therethrough and turning over the material to expose new surfaces for contact with the drying air. These agitators are arranged to turn the material disposed at the longitudinal edges of the layers inwardly toward the center and other blades on the agitators are arranged alternately to turn over the material in opposite directions, thus insuring a maximum engagement of the drying air with the material to be dried.

In conjunction with the drying mechanism means is provided for automatically regulating the temperature of the drying air so as to insure uniform drying of the material during its passage through the apparatus. The air after passing over the material in the drier is maintained at a uniform temperature and the air entering the drier is raised or lowered in temperature to maintain this uniform temperature for the discharged air. Furthermore, the drying apparatus is so arranged that the drying air crosses the conveyors and layers thereon alternately in opposite directions in successive units. Further details of the invention will appear from the following description.

In the particular embodiment of the invention illustrated, the desiccating apparatus comprises a plurality of units designated on Fig. 9 in the diagram as A, B, C, D, E and F. Any desired number of units may be used. In Figs. 1, 2 and 8, units A, B, E and F are illustrated, these views being broken away at the center.

As shown particularly in Fig. 8, the apparatus comprises a hopper 20 and five endless conveyors 21, 22, 23, 24 and 25. These conveyors travel alternately in opposite directions as indicated by the arrows.

The top conveyor 21 extends beneath the hopper 20 and the shredded coconut which is disposed in the hopper falls by gravity on the conveyor 21. In order to insure a layer of uniform thickness and of predetermined thickness on the conveyor 21, there is provided a corrugated roller 30 which is carried by a plate or bracket 31 adjustably connected at 32 to the front wall 33 of the hopper 20 (see Fig. 4). The roller 30 is driven in the manner hereinafter described in the direction of the arrow shown in Fig. 4, or, in a direction opposite to the direction of movement of the conveyor 21. Thus the roller 30 tends to turn back into the hopper the upper portion of the shredded coconut or other material which extends above the predetermined thickness determined by the vertical adjustment of the plate 31 and roller 30.

In each of the units there are provided agitators for engaging, stirring and turning over the material passing therethrough in order to insure the engagement of the drying air with new portions or surfaces of the material.

In unit A there are shown diagrammatically Fig. 8, three agitators 40, 41 and 42 which engage the materials on the conveyors 21, 23 and 25. In unit B two agitators are shown, namely, 43 and 44. These agitators engage the material on conveyors 22 and 24.

Unit E has three agitators, 50, 51 and 52, which coact with the material on conveyors 21, 23 and 25, and unit F has two agitators, 53 and 54, which coact with the material on conveyors 22 and 24.

The construction of the agitators is illustrated particularly in Figs. 6 and 7. In these figures there is shown a central core or pipe 60 to which are secured plates which are bent to form right angle sections 61 and 62. Each of the plates has equally spaced notches 63 formed therein and the blades 64 formed by the notches are bent relative to the axis of the pipe or tube 60 in a manner to turn over the material engaged thereby and to throw it in the desired direction. From reference to Fig. 7 it will be seen that the blades 64 at each end of the agitator are turned in a direction to throw the material inwardly from the longitudinal edges of the conveyor and material disposed thereon. As illustrated, the four blades at each end are so turned. The remaining blades are turned alternately in opposite directions and thus throw the material alternately toward the right or left. At each end of the pipe there is shown a disk 65 which is disposed outside of the end blades.

The rotation of the agitators, as will be seen, effectively stirs the shredded coconut or other material disposed on the conveyors, and exposes new portions thereof to drying action by air passing through chambers in the manner hereinafter described. Furthermore, the spacing of the blades will form longitudinal grooves in the material.

*Driving connections*

The driving connections for the conveyors and agitators will now be described. As shown in Figs. 1 and 2, a motor M has a shaft 70 which is connected by a belt 71 and pulleys 72 and 73 to drive a shaft 74 of variable speed driving mechanism 75. The driving mechanism 75 has a driven shaft 76 on which are mounted a pair of sprocket wheels 77 and 78. Sprocket wheel 77 is connected by a chain 80 to drive a sprocket wheel 81 mounted on a shaft 82. Shaft 82 has also mounted thereon a sprocket wheel 83 which drives a sprocket wheel 84 mounted on the shaft of the roller 30. The sprocket chain which drives the roller sprocket 84 also extends around an idler 85.

The shaft 82 has also mounted thereon a sprocket 90 which is connected by a chain 91 to drive a sprocket 92 mounted on the shaft 93 which has also mounted thereon a roller 94 which drives the conveyor 22.

The shaft 82 has also mounted thereon a sprocket 100 which is connected by a chain 101 to drive a sprocket 102 mounted on the shaft to which is secured roller 103 which supports and drives the conveyor 24.

The sprocket 78 is connected by a chain 110 to drive a sprocket 111 mounted on a shaft 112. This shaft has also secured thereto a sprocket 113 which drives a chain 114. This chain, as shown diagrammatically in Fig. 1, drives the agitators 40, 41 and 42, the chain 114 engaging suitable sprocket wheels on the shafts of these agitators and also extending around idlers 115, 116 and 117. In this manner the three agitators 40, 41 and 42 are driven in a clockwise direction, as indicated by the arrows. Further showing of the sprockets on the agitator shafts and of the idlers is not deemed necessary.

The shaft 112 has also mounted thereon a sprocket 120 which is connected by a chain 121 to drive a sprocket 122 mounted on the shaft 123. The shaft 123 has also secured thereto a sprocket wheel 124 which drives the chain 125 which in turn drives the agitators 43 and 44 in the manner shown diagrammatically in Fig. 1. These agitators are rotated in an anti-clockwise direction.

The driving mechanism for the conveyors 21, 23 and 25 is mounted on the unit F at the other end of the apparatus. This mechanism comprises a motor M' which drives a variable speed mechanism 130, which in turn drives a shaft 131. Shaft 131 through sprocket 132, chain 133 and sprocket 134, drives shaft 135. This shaft is connected by sprocket 136, chain 137 and sprocket 138 to shaft 139 on which is mounted the roller which supports the outer end of the conveyor 21. Shaft 135 also has a sprocket 145 which is connected by a chain 146 to a sprocket 147 which drives the roller 148 which supports the far end of the conveyor 23. A sprocket 150 is also mounted on the shaft 135 and is connected by a sprocket chain 151 to a sprocket 152 mounted on a shaft 153 which supports a roller 154 of the conveyor 25.

Shaft 131 also carries a sprocket 160 which is connected by a chain 161 to a sprocket 162 mounted on a shaft 163. Shaft 163 also carries sprockets 164 and 165. Sprocket 164 drives a chain 166 which drives suitable sprockets, not shown, on the shafts of agitators 53 and 54. This drive is shown diagrammatically and the chain 166 passes around idlers 167 and 168. The agitators 53 and 54 are driven in an anti-clockwise direction, viewing Fig. 1.

Sprocket wheel 165 drives a chain 170 and a sprocket 171 mounted on a shaft 172. A sprocket 173 is also mounted on the shaft 172 and drives a chain 174, which, as shown diagrammatically in Fig. 1, drives the agitators 50, 51 and 52 in the direction of the arrows in Fig. 1, or, in a clockwise direction. Suitable idlers are provided for the chain 174.

From the foregoing description the driving connections for the conveyors and agitators will be clear. It will be noted that baffles or deflectors 180 and 181 are provided for receiving the material from the conveyors 22 and 24 and directing this material onto the conveyors 23 and 25 and similar baffles 182 and 183 receive and deflect the material from the conveyors 21 and 23 onto the conveyors 22 and 24. A scraper 184 engages the lower lap of the conveyor 25 and removes any material therefrom which is carried around the roller 154.

Air heating and circulation mechanism

Each unit has mounted thereon mechanism for heating and circulating the air through the heating chamber above the conveyors and material thereon. This mechanism is illustrated particularly in Fig. 3. Each circulation unit comprises a fan 200 which is driven by a motor 201 and receives air through a conduit 202 from the exhaust chamber 203 of the unit B. Each unit, as shown in Fig. 3, is divided by a partition 204 into two chambers 205 and 203. The air circulated by the fan is forced through a conduit 206 into a chamber 207 and thence through a heating unit 208 through a conduit 211 into the chamber 205. The chamber 207 has an air outlet conduit 209 provided with a damper 210.

An air inlet conduit 215 is provided in the chamber 203 and is open to the atmosphere. A conduit 216 communicates with the chamber 205 but is normally closed by a valve or cover 217.

Means is provided in connection with the air heating and circulation system for automatically regulating the heater 208 in such a manner as to maintain a required temperature for the air entering the chamber 205 from the chamber 207. This is accomplished by providing a thermostat 220 in the conduit 202 or in the path of the air exhausted or drawn out of the chamber 203 and set to maintain a uniform temperature. The thermostat is connected with a valve 221 which regulates the steam entering the heater 208 through an inlet pipe 222. The steam outlet pipe is shown at 223.

Heated air from the chamber 205 enters the drier chamber 225 through openings 226 and air leaves this chamber through openings 227 which communicate with the chamber 203.

As illustrated in Figs. 2 and 9, the circulation of the hot air through the heating chambers of the units is alternated in successive units. For instance, in unit A the hot air goes through the chamber in one direction and in unit B it passes through in the opposite direction. Thus the material at the opposite longitudinal edges of the conveyors receives the hot air alternately.

The damper 210 is manually regulated in any desired manner to control the amount of air exhausted through the conduit 209. Air is automatically replenished in the chamber 203 and the amount of air entering the chamber 203 is determined by various considerations, including the adjustment of the damper 210. As more air enters the chamber 203 through the conduit 215, the temperature of the air will obviously be lowered and the thermostat 220 through the connection 230 to the valve 221 will so control the admission of steam through the conduit 222 as to raise or lower the temperature of the air fed into the chamber 205 so as to uniformly dry the material.

From the foregoing description it will be clear that a simple and practical apparatus has been provided for desiccating material, such as shredded coconut meat, and since the thickness of the layer of material fed through the drying chambers is maintained uniform and this material is agitated in the manner described and further the temperature of the hot air fed to the drying chambers is regulated to conform to the drying requirements, a uniform product will result.

Although one specific embodiment of the invention has been particularly shown and described, it will be understood that the invention is capable of modification and that changes in the construction and in the arrangement of the various cooperating parts may be made without departing from the spirit or scope of the invention.

What I claim is:

1. A machine for desiccating moist material, such as shredded coconut, and comprising a drying chamber, means for circulating a drying medium through said chamber, a conveyor movable through said chamber, a roller located at the receiving end of the conveyor and rotatable in a direction opposite to the conveyor movement and engageable with the material on the conveyor for insuring a uniform layer of material thereon, means for rotating said roller, means for engaging the layer of material and exposing inner portions of the layer to the action of the drying medium, and means for rotating said last named means.

2. A machine for desiccating moist material such as shredded coconut comprising a drying chamber, means for circulating a drying medium through said chamber, a conveyor movable through said chamber, rotatable means located at the receiving end of the conveyor and engageable with the material on the conveyor for insuring a uniform layer of shredded coconut thereon, means for rotating said second mentioned means in a direction opposite to the direction of movement of the conveyor, and rotating means having transversely spaced blades for engaging the layer of material forming grooves therein, exposing inner portions of the layer to the action of the drying medium, and means for rotating said last named means.

3. A machine for desiccating moist material such as shredded coconut comprising a drying chamber, means for circulating a drying medium through said chamber a conveyor movable through said chamber, a corrugated roller located above the receiving end of the conveyor and engageable with the material on the conveyor for insuring a uniform layer of said material thereon, and means for rotating said roller in a direction opposite to the direction of movement of the conveyor.

4. A machine for desiccating moist material comprising a drying chamber, means for circulating a drying medium through said chamber, a conveyor movable through said chamber, means located above the receiving end of the conveyor and engageable with the material on the conveyor for insuring a uniform layer of shredded coconut thereon, means for rotating said second mentioned means in a direction opposite to the directon of movement of the conveyor rotating means for engaging the layer of material and forming grooves therein, exposing inner portions of the layer to the action of the drying medium, said rotating means having blades at the ends constructed and arranged to direct the material inwardly toward the longitudinal center of the conveyor and away from the lateral edges thereof, and means for rotating said last named means.

5. A machine for desiccating moist material comprising a drying chamber, means for circulating a drying medium through said chamber, a conveyor movable through said chamber, means located above the receiving end of the conveyor and engageable with the material on the conveyor for insuring a uniform layer of shredded coconut thereon, means for rotating said second mentioned means in a direction opposite to the direction of movement of the conveyor, rotating means having blades for engaging the layer of material and forming grooves therein, exposing inner portions of the layer to the action of the drying medium, the blades at the ends of said rotating means being constructed and arranged to direct the material inwardly toward the longitudinal center of the conveyor and away from the lateral edges thereof, the remaining blades being angled to throw the material alternately in opposite directions and means for rotating said last named means.

LOUIS H. ZEUN.